United States Patent
Aboul-Magd et al.

(10) Patent No.: US 9,351,297 B2
(45) Date of Patent: May 24, 2016

(54) SYSTEM AND METHOD FOR A COLLABORATIVE SERVICE SET

(71) Applicant: Huawei Technologies Co., Ltd., Shenzhen (CN)

(72) Inventors: Osama Aboul-Magd, Kanata (CA); Kwok Shum Au, Shenzhen (CN); Jung Hoon Suh, Kanata (CA); Sheng Sun, Kanata (CA); Peiying Zhu, Kanata (CA); Wolfgang Oberhammer, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 221 days.

(21) Appl. No.: 13/953,378

(22) Filed: Jul. 29, 2013

(65) Prior Publication Data

US 2014/0056205 A1    Feb. 27, 2014

Related U.S. Application Data

(60) Provisional application No. 61/693,527, filed on Aug. 27, 2012, provisional application No. 61/693,651, filed on Aug. 27, 2012.

(51) Int. Cl.
| | | |
|---|---|---|
| H04W 72/04 | (2009.01) | |
| H04W 28/16 | (2009.01) | |
| H04W 74/08 | (2009.01) | |
| H04W 84/12 | (2009.01) | |
| H04W 92/12 | (2009.01) | |
| H04W 92/20 | (2009.01) | |

(52) U.S. Cl.
CPC .......... *H04W 72/0426* (2013.01); *H04W 28/16* (2013.01); *H04W 74/0816* (2013.01); *H04W 84/12* (2013.01); *H04W 92/12* (2013.01); *H04W 92/20* (2013.01)

(58) Field of Classification Search
None
See application file for complete search history.

(56) References Cited

U.S. PATENT DOCUMENTS

| 7,881,313 | B2 * | 2/2011 | Scherzer et al. | .............. 370/401 |
| 7,978,652 | B2 | 7/2011 | Chandra et al. | |
| 8,194,599 | B2 * | 6/2012 | Marinier | ............... H04W 28/18 |
| | | | | 370/254 |
| 2003/0206532 | A1 | 11/2003 | Shpak | |

(Continued)

FOREIGN PATENT DOCUMENTS

| CN | 101926128 | 12/2010 |
| CN | 102779840 A | 11/2012 |

(Continued)

OTHER PUBLICATIONS

International Search Report received in Application No. PCT/CN2013/080963, mailed Nov. 14, 2013, 12 pages.

(Continued)

*Primary Examiner* — Habte Mered
(74) *Attorney, Agent, or Firm* — Slater Matsil, LLP

(57) ABSTRACT

In one embodiment, a collaborative service set (CSS) includes a controller access point (AP) configured to be associated with a first plurality of stations and a first member AP, where the first member AP is associated with a second plurality of stations, where the controller AP is configured to coordinate transmissions between the first member AP and the second plurality of stations with transmissions between the controller AP and the first plurality of stations, where the controller AP and the first member AP are configured to transmit messages simultaneously.

20 Claims, 14 Drawing Sheets

(56) References Cited

U.S. PATENT DOCUMENTS

| | | | |
|---|---|---|---|
| 2006/0029028 A1* | 2/2006 | Kim | H04W 84/12 370/338 |
| 2009/0185514 A1* | 7/2009 | Chandra et al. | 370/310 |
| 2010/0067504 A1 | 3/2010 | Chen et al. | |
| 2012/0026909 A1 | 2/2012 | Seok | |
| 2012/0068310 A1 | 3/2012 | Uemura | |
| 2012/0140753 A1 | 6/2012 | Lee et al. | |
| 2013/0022024 A1* | 1/2013 | Chu et al. | 370/332 |
| 2013/0089123 A1* | 4/2013 | Rahul | H04L 27/2691 375/219 |
| 2014/0192785 A1* | 7/2014 | Gong | 370/336 |
| 2014/0369302 A1 | 12/2014 | Abraham et al. | |

FOREIGN PATENT DOCUMENTS

| | | |
|---|---|---|
| CN | 103094332 A | 5/2013 |
| WO | 9800946 | 1/1998 |
| WO | 2012-044863 A1 | 4/2012 |
| WO | 2012074251 | 6/2012 |

OTHER PUBLICATIONS

"Notification of Transmittal of the International Search Report and the Written Opinion of the International Searching Authority, or the Declaration," for PCT Application Serial No. CN2013/082386, dated Nov. 14, 2013, 13 pages.

"Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 4: Enhancement for Very High Throughput for Operation in Bands Below 6 GHzm," IEEE P802.11ac™/D3.0, Jun. 2012, 385 pages.

"IEEE Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications," IEEE Std 802.11™-2012, Mar. 29, 2012, 2,793 pages.

Perahia, E., "Gigabit Wireless Lans: an overview of IEEE802.11ax and 802, 11ad", XP055238376, Retrieved from the Internet: URL:https://cs.uwaterloo.ca/brecht/courses/856-802.11-Network-Performance-2014/readings/recent-advances/gbit_wlan-r6.pdf, Dec. 3, 2011, 11 pages.

* cited by examiner

SYSTEM AND METHOD FOR A COLLABORATIVE SERVICE SET

This application claims the benefit of U.S. Provisional Application Ser. No. 61/693,527 filed on Aug. 27, 2012 and entitled "System and Method for Collaborative Service Set for Wireless Local Area Networks," and U.S. Provisional Application Ser. No. 61/693,651 filed on Aug. 27, 2012 and entitled "System and Method for Channel Sounding in Wireless Local Area Networks," which applications are hereby incorporated herein by reference.

TECHNICAL FIELD

The present invention relates to a system and method for wireless communications, and, in particular, to a system and method for a collaborative service set (CSS).

BACKGROUND

Wireless local area networks (WLANs) link wireless devices. Under the Institute of Electrical and Electronics Engineers (IEEE) 802.11 standards, a physical layer standard for implementing WLAN communications, access points (APs) communicate with associated stations (STAs). APs are base stations for wireless networks that transmit and receive wireless communications from stations. An AP and its associated stations may be configured in a basic service set (BSS), where the stations are associated with the AP in the BSS. As the demand for wireless throughput increases, APs are more densely populated. It is desirable for densely located APs to coordinate transmissions.

Interference alignment (IA) is a multi-device transmission method in which interfering transmitters pre-code their signals in unwanted users' receive space, enabling these receivers to successfully acquire signals intended for them.

SUMMARY

An embodiment collaborative service set (CSS) includes a controller access point (AP) configured to be associated with a first plurality of stations and a first member AP, where the first member AP is associated with a second plurality of stations, where the controller AP is configured to coordinate transmissions between the first member AP and the second plurality of stations with transmissions between the controller AP and the first plurality of stations, where the controller AP and the first member AP are configured to transmit messages simultaneously.

An embodiment method of channel sounding in a collaborative service set (CSS) includes broadcasting, by a first access point (AP), a first null data packet announcement (NDPA) including a short identification number (ID) of a first station and broadcasting, by the first AP, a first null data packet (NDP) after transmitting the first NDPA. The method also includes receiving, by the first AP from a second AP, a second NDPA and receiving, by the first AP from the second AP, a second NDP after receiving the second NDPA. Additionally, the method includes transmitting, by the first AP to the first station, a first polling frame after transmitting the first NDP and receiving the second NDP and receiving, by the first AP from the first station, a first feedback report after transmitting the first polling frame.

An embodiment method of channel sounding in a collaborative service set (CSS) includes receiving, by a station from a first access point (AP), a first null data packet announcement (NDPA) including a first simplified short identification number (ID) of the station and receiving, by the station from the first AP, a first null data packet (NDP) after receiving the first NDPA. The method also includes receiving, by the station from a second AP, a second NDPA after receiving the first NDP and receiving, by the station from the second AP, a second NDP after receiving the second NDPA. Additionally, the method includes estimating a first channel between the station and the first AP in accordance with the first NDP to produce a first estimated channel and receiving a first polling frame, by the station from the first AP. Also, the method includes broadcasting, by the station, a first feedback report in accordance with the first estimated channel after receiving the first polling frame.

An embodiment method of determining an oscillator frequency offset between a first access point (AP) and a second AP includes receiving, by the second AP from the first AP, a first packet including a first preamble and receiving, by the second AP from the first AP, a second packet including a second preamble after receiving the first packet. Additionally, the method includes determining an oscillator frequency offset between the first AP and the second AP in accordance with the first preamble and the second preamble.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
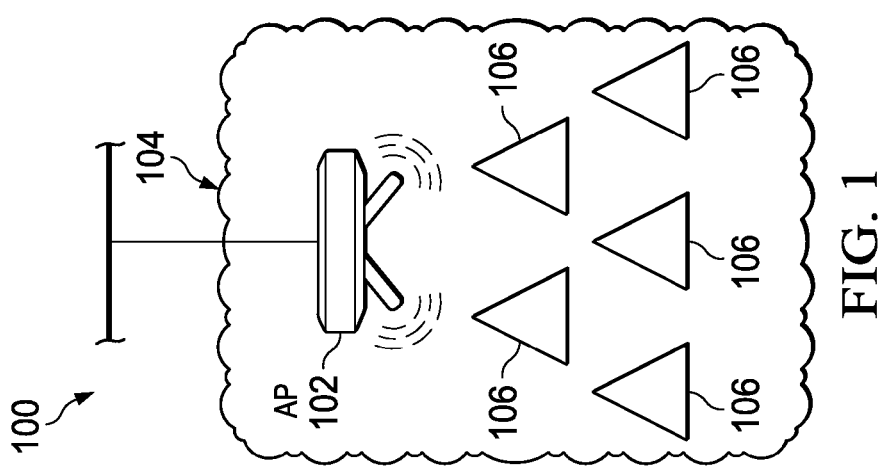
FIG. 1 illustrates an embodiment basic service set (BSS)

FIG. 1 illustrates basic service set (BSS) 100 for communicating data in a wireless local area network (WLAN). BSS 100 comprises access point (AP) 102 having a coverage area 104 and a plurality of stations (STAs) 106. Five stations are pictured, but many more may be present. AP 102 may be any component capable of providing wireless access by, inter alia, establishing uplink and/or downlink connections with stations 106, such as base stations, enhanced base stations (eNBs), picocells, femtocells, and other wirelessly enabled devices. Stations 106 may be any components capable of establishing a wireless connection with AP 102, such as cell phones, smart phones, tablets, laptop computers, sensors, etc.

Figure 2:
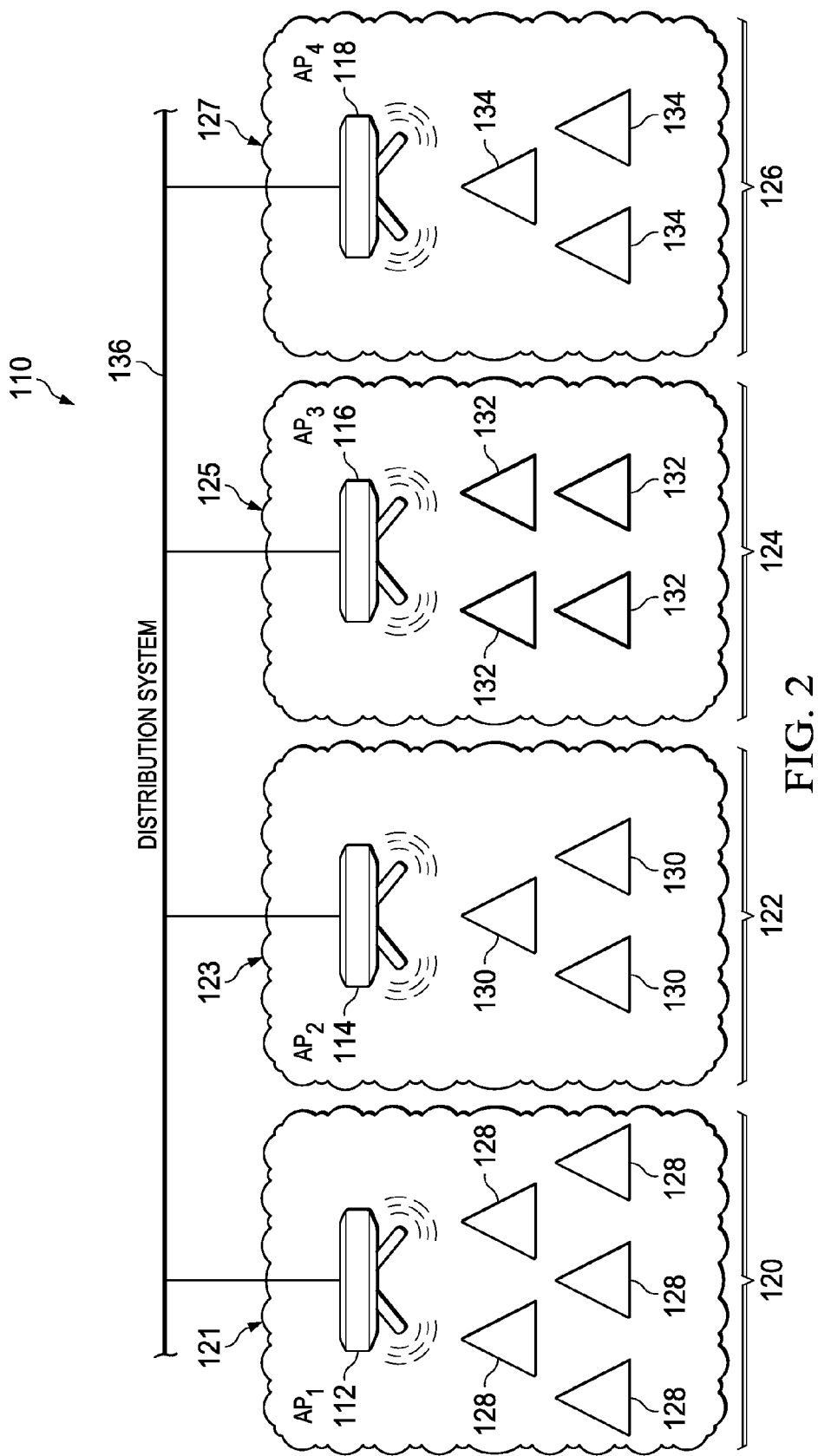
FIG. 2 illustrates an embodiment extended service set (ESS)

FIG. 2 illustrates extended service set (ESS) 110, which contains BSSs 120, 122, 124, and 126 that are connected by distribution system (DS) 136. DS 136 enables communications between stations. In one example, DS 136 is wired Ethernet. In another example, DS 136 is a wireless connection. Each BSS contains an AP (112, 114, 116, and 118, respectively) with a coverage area (121, 123, 125, and 127, respectively) and a plurality of stations associated with the AP (128, 130, 132, and 134, respectively). ESS 110 is deployed and managed by a single entity. All BSSs use the same service set identity (SSID), and the station IDs may not be unique. Stations may freely roam between APs in ESS 110. ESS 110 has an extended range compared to BSS 100. BSSs 120, 122, 124, and 126 are independent, and compete for the wireless medium.

Figure 3:
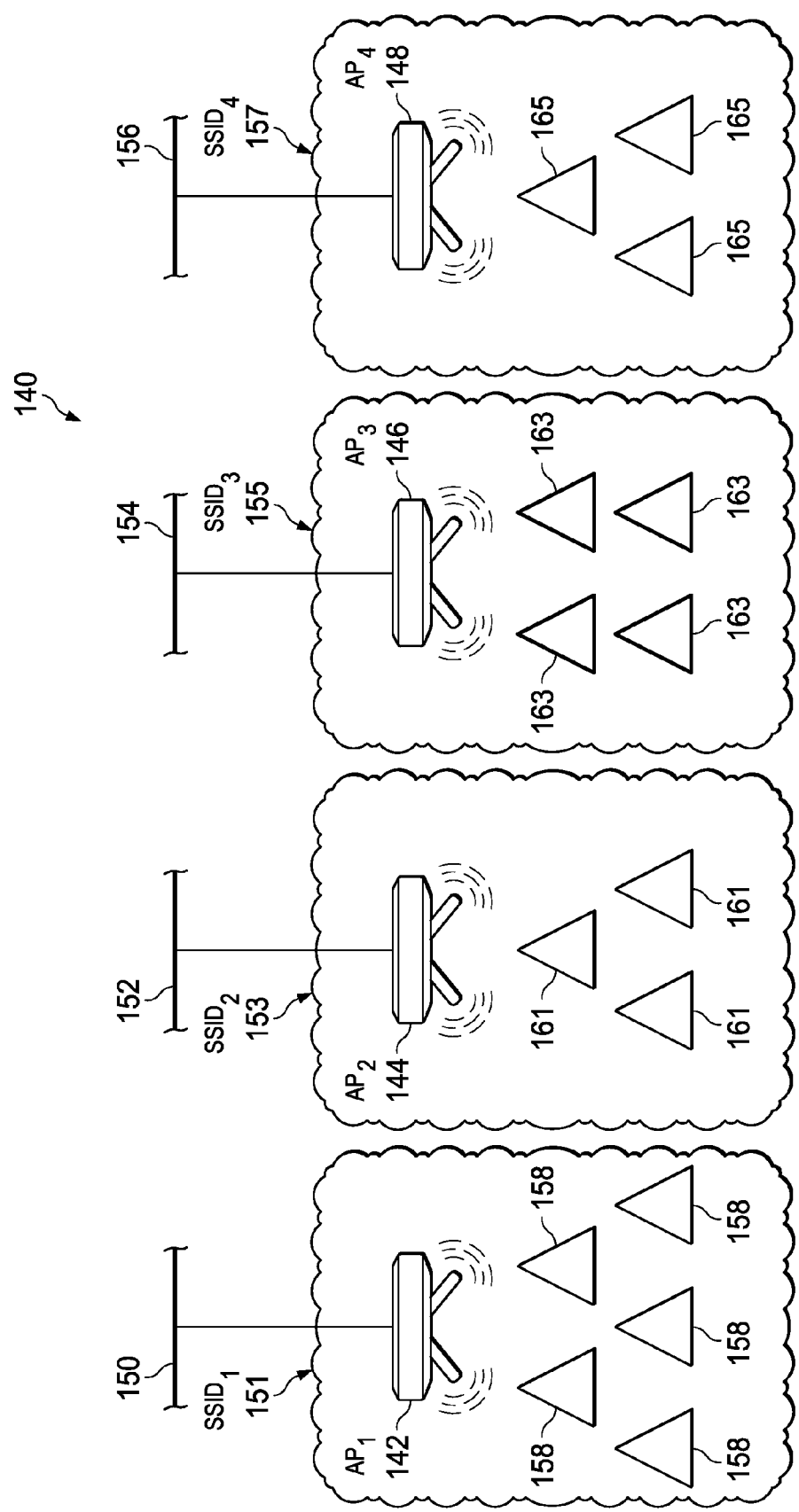
FIG. 3 illustrates an embodiment overlapping basic service set (OBSS)

FIG. 3 illustrates overlapping basic service set (OBSS) 140, another situation where APs interact. OBSS 140 contains BSSs 150, 152, 154, and 156. The BSSs contain an AP (142, 144, 146, and 148, respectively) with a coverage area (151, 153, 155, and 157, respectively), with a plurality of stations (158, 161, 163, and 165, respectively) coupled to the AP. In an example, an OBSS occurs in neighboring buildings or in an apartment building where each tenant deploys a separate AP. OBSS 140 is deployed and managed by independent entities (APs 142, 144, 146, and 148). The BSSs have separate SSIDs, and the station IDs may not be unique. To move from one AP to another, a station disassociates from an AP and associates with another AP.

Table 1 below compares characteristics of ESSs and OBSSs. Both ESSs and OBSSs contain multiple APs that operate independently from each other. Each AP has its own associated stations and its own timing and synchronization functions. There is little to no coordination or exchange of information between APs in an ESS or an OBSS. In both ESS 110 and OBSS 140, multiple APs are implicitly coordinated using the carrier sense multiple access/collision avoidance (CSMA/CA) and the clear channel assessment (CCA) function. An AP or a station that senses the wireless medium is busy defers its transmission to avoid collisions, so only a single device is transmitting at a time. Thus, at most one device is transmitting at a time within range of each other.

TABLE 1

| ESS | OBSS |
|---|---|
| Deployed and managed by a single entity | Deployed and managed by independent entities |
| DS exists | No DS |
| Single SSID | Multiple SSIDs |
| STA ID may not be unique | STA ID may not be unique |
| STAs can freely roam between APs in the same ESS | STAs cannot move from one AP to the other without de-associating and then associating |

Figure 4:
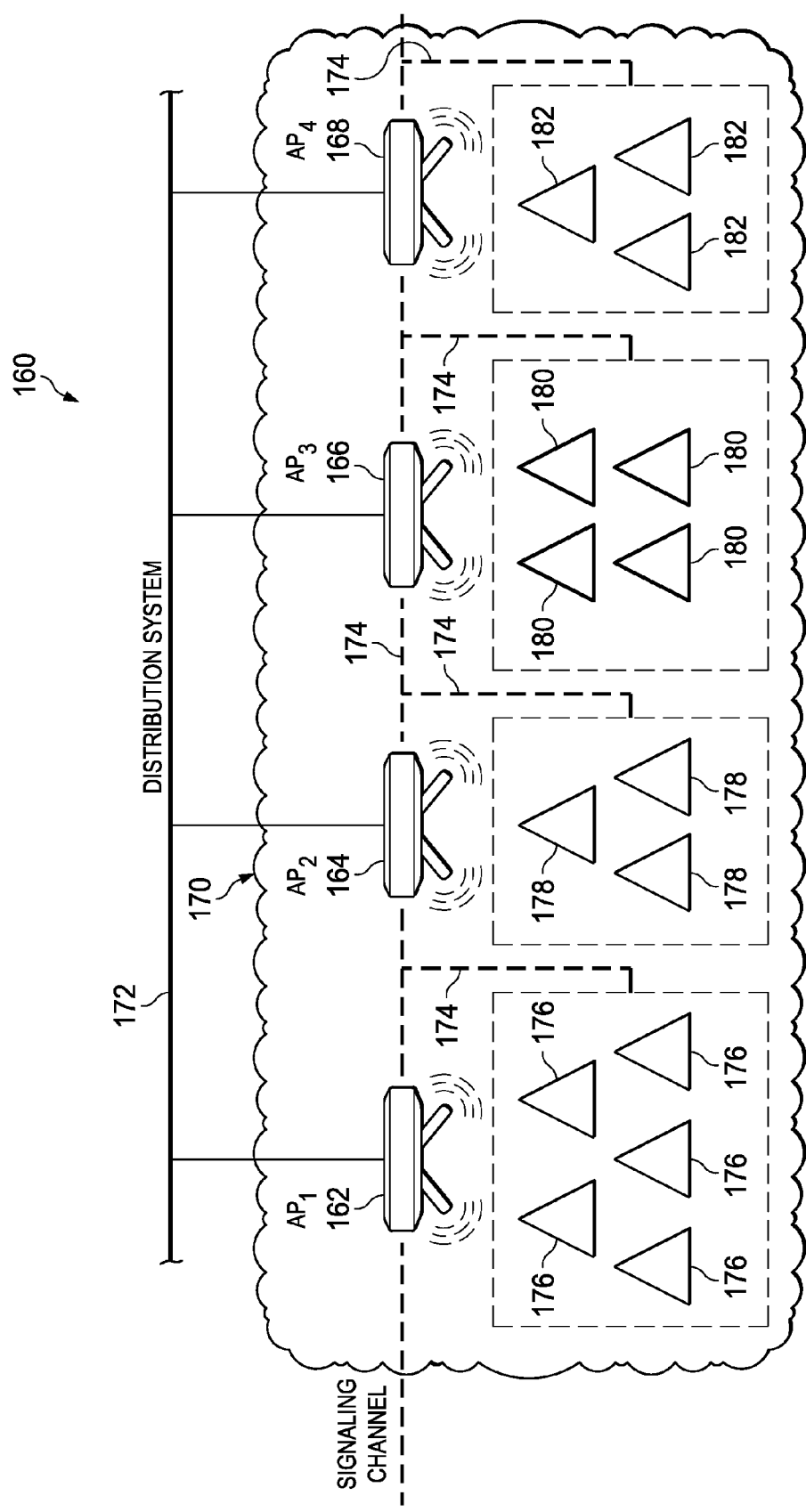
FIG. 4 illustrates an embodiment collaborative service set (CSS)

FIG. 4 illustrates collaborative service set (CSS) 160, which facilitates the collaboration among multiple APs (162, 164, 166, and 168) located nearby to improve throughput. The APs are associated with a plurality of stations (176, 178, 180, and 182, respectively). Coverage area 170 is an extended cloud for CSS 160. In CSS 160, multiple devices may transmit simultaneously. Signaling channel 174 couples APs 162, 164, 166, and 168 and pluralities of stations 176, 178, 180, and 182. CSS 160 enables stations to move freely among different APs without losing connectivity. Also, CSS 160 contains distribution system 172.

In CSS 160, one AP is designated as a controller AP, and supervises the inter-AP coordination. The other APs are member APs. In one example, the controller AP is one of the member APs, for example AP 162 is the controller AP. In another example, the controller AP is a separate entity that makes use of the services of one or more member APs to dispatch control messages. In this example, the controller AP communicates with the member APs using distribution system 172. In both examples, the controller AP controls and supervises the collection of channel information and simultaneous transmissions from the member APs. The member APs are registered with the controller AP.

The stations in CSS 160 are given unique short identification numbers (IDs) that are shorter than their media access control (MAC) addresses. The short ID may be based on an association ID (AID). Alternatively, the short ID is a unique ID based on another assignment. When an AID is used, the uniqueness of the AID may be facilitated by dividing the AID space between the APs. For example, if the AID space includes 2000 IDs and there are three APs, the first AP is assigned AIDs 1-667 the second AP is assigned AIDs 668-1334, and the third AP is assigned AIDs 1335-2000. In another example, each AP requests a short ID from the controller AP for its associated stations and conveys the assigned value. In one example, the short IDs are assigned by the controller AP. In another example, the short unique IDs are assigned in a distributed fashion by the member APs for their associated stations. The short IDs are available for the controller AP and the member APs.

The APs and associated stations have access to signaling channel 174. Signaling channel 174 may be used to exchange control information between the APs and the stations.

When member APs associate with the CSS, they are given a rank or order. Distribution system 172 may be used for registration. Alternatively, registration is performed by exchanging management frames using a wireless media. In one example, the member APs are within transmission range of each other. In another example, some member APs are not in transmission range of some other member APs. When not all member APs are in range, the controller AP may select a subset of member APs that are within range of each other, and assign a leader AP of the member APs to perform the coordination function. Alternatively, the leader AP is the AP that currently has access to the wireless media. The leader AP has temporary control of the CSS operation for the duration of the transmission opportunity. Then, the leader AP cedes control at the end of the transmission opportunity or when no frames are available to transmit. In an example, the throughput is increased by enabling multiple APs in a CSS to transmit at a time. Thus, the data rate may grow linearly.

Stations may associate with CSS 160 similarly to how stations associate with an ESS. A station may associate with any member AP that is within range. A station does not need to be within the range of all member APs. The controller AP may propagate member AP information to the stations.

Table 2 below compares features of a CSS, an ESS, and an OBSS.

TABLE 2

| CSS | ESS | OBSS |
| --- | --- | --- |
| Deployed and managed by a single entity | Deployed and managed by a single entity | Deployed and managed by independent entities |
| DS exists | DS exists | No DS |
| Single SSID | Single SSID | Multiple SSIDs |
| STA can freely roam between APs in the same CSS | STA can freely roam between APs in the same ESS | STA cannot move from one AP to the other without de-associating and then associating |
| Existence of a controller | No controller | No controller |
| Unique STA ID | STA ID may not be unique | STA ID may not be unique |
| Existence of signaling channel | No signaling channel | No signaling channel |
| A leader coordinates multiple-device transmissions | Single device transmission at any point in the time | Single device transmission at any point in the time |

In an example, a simplified CSS is formed, where all stations associate with the controller AP and all member APs and stations are within range of the controller AP. In this arrangement, the uniqueness of the assigned AIDs is assured without the need to exchange information between the member APs. The controller AP may assign stations to the member APs to distribute the load. The range of a simplified CSS is limited to the range of a single BSS. Thus, a simplified CSS increases throughput without increasing range.

In an embodiment, CSS 160 is backward compatible with other WLAN architectures and with legacy devices. In a dense WLAN deployment environment, a CSS may coexist with other WLAN deployments. APs and stations of a CSS may use CCA and CSMA/CA to gain access to the wireless medium. Upon gaining access to the wireless medium, a CSS station may invite other stations belonging to the CSS to act simultaneously to improve the throughput during the duration of the granted opportunity.

Figure 5:
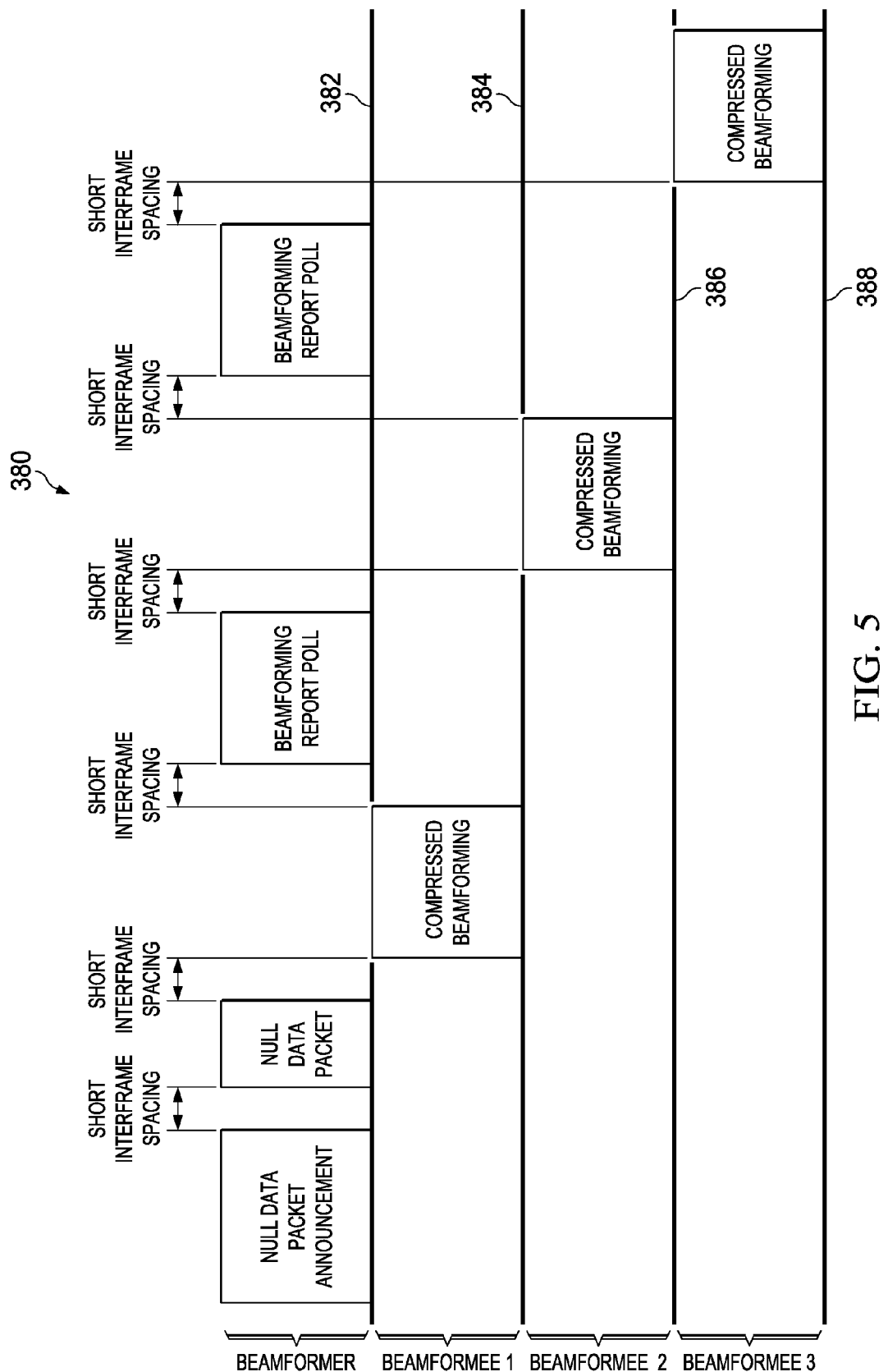
FIG. 5 illustrates an embodiment protocol for channel sounding.

FIG. 5 illustrates protocol 380 for collecting channel feedback in a BSS with AP 382 associated with stations 384, 386, and 388. Initially, AP 382 broadcasts a null data packet announcement (NDPA). Then, after a short interframe spacing (SIFS), AP 382 broadcasts a null data packet (NDP) containing only a physical (PHY) layer header, without a MAC header. In response, after a SIFS, station 384 transmits a compressed beamforming report. Then, after a SIFS, AP 382 transmits a beamforming report poll. In response, after a SIFS, station 386 transmits a compressed beamforming report. Next, after a SIFS, AP 382 transmits another beamforming report poll. Finally, after a SIFS, station 388 responds with a compressed beamforming report. The stations follow in order from the announcement frames.

Figure 6:
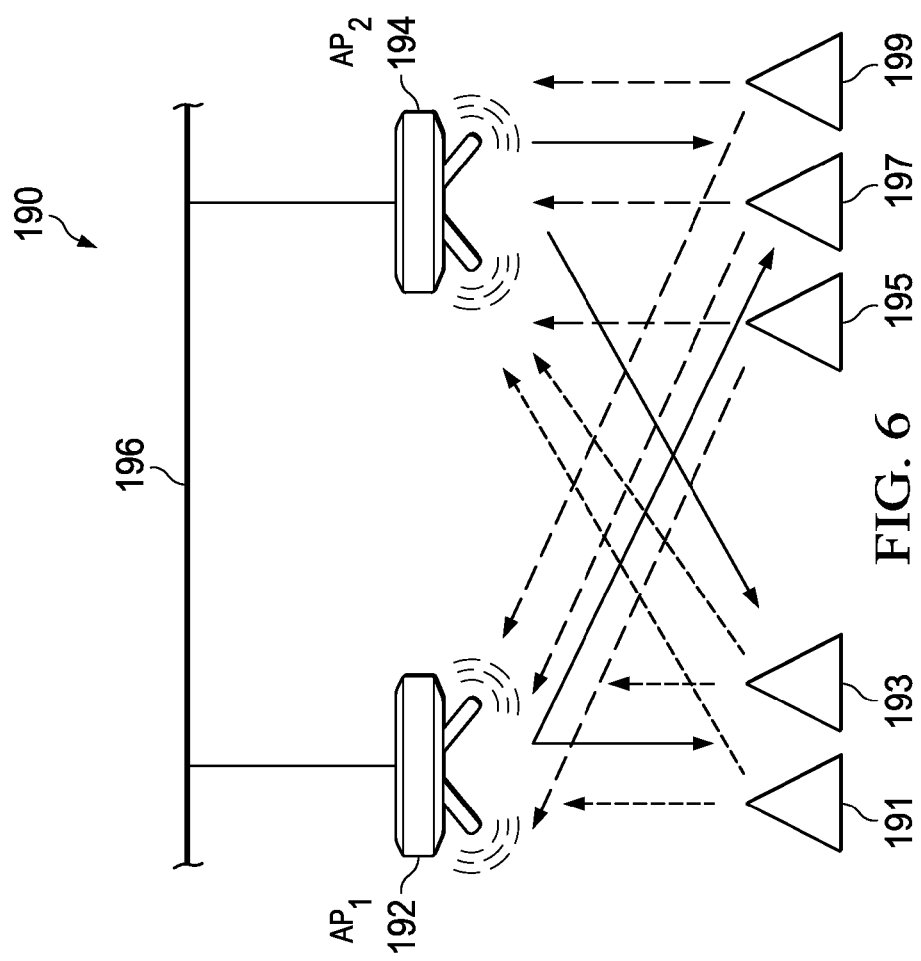
FIG. 6 illustrates another embodiment CSS.

FIG. 6 illustrates CSS 190 for channel sounding with interference alignment. CSS 190 contains AP 192 associated with stations 191 and 193, and AP 194 associated with stations 195, 197, and 199. Distribution system 196 couples AP 192 and AP 194. To implement interference alignment in a wireless network, knowledge of the channels between interfering devices is collected and distributed among these devices. Ten channels between APs 192 and 194 and stations 191, 193, 195, 197, and 199 may be estimated. CSS 190 facilitates cooperation between devices participating in interference alignment. In an example, a channel sounding protocol for downlink interference alignment and channel estimation for interference alignment is based on CSS 190. Channel information is collected to facilitate multiple device transmissions using interference alignment.

In an example, explicit channel sounding, which may be used for beamforming, uses null data packets (NDPs) for channel sounding. An NDP is a data packet containing only the PHY layer header. The NDP is transmitted from an AP to stations when channel information is requested. The NDP is preceded by an NDP announcement (NDPA) that includes the station IDs of the target stations. The AP then polls the target stations to request feedback reports containing the estimated channel information.

In an example, a channel sounding protocol is based on the cooperation among a group of APs in a CSS for collecting and transmitting channel information. The APs select sets of target stations to participate in interference alignment. In a simplified CSS, the controller AP may perform the selection for the entire CSS without involving the other member APs.

Each station that is a member of the CSS has a unique ID that is not dependent on which AP that station is associated with. The unique IDs are available to the controller AP and the member APs to enable member APs to unambiguously correlate channel feedback to the corresponding station.

Figure 7:
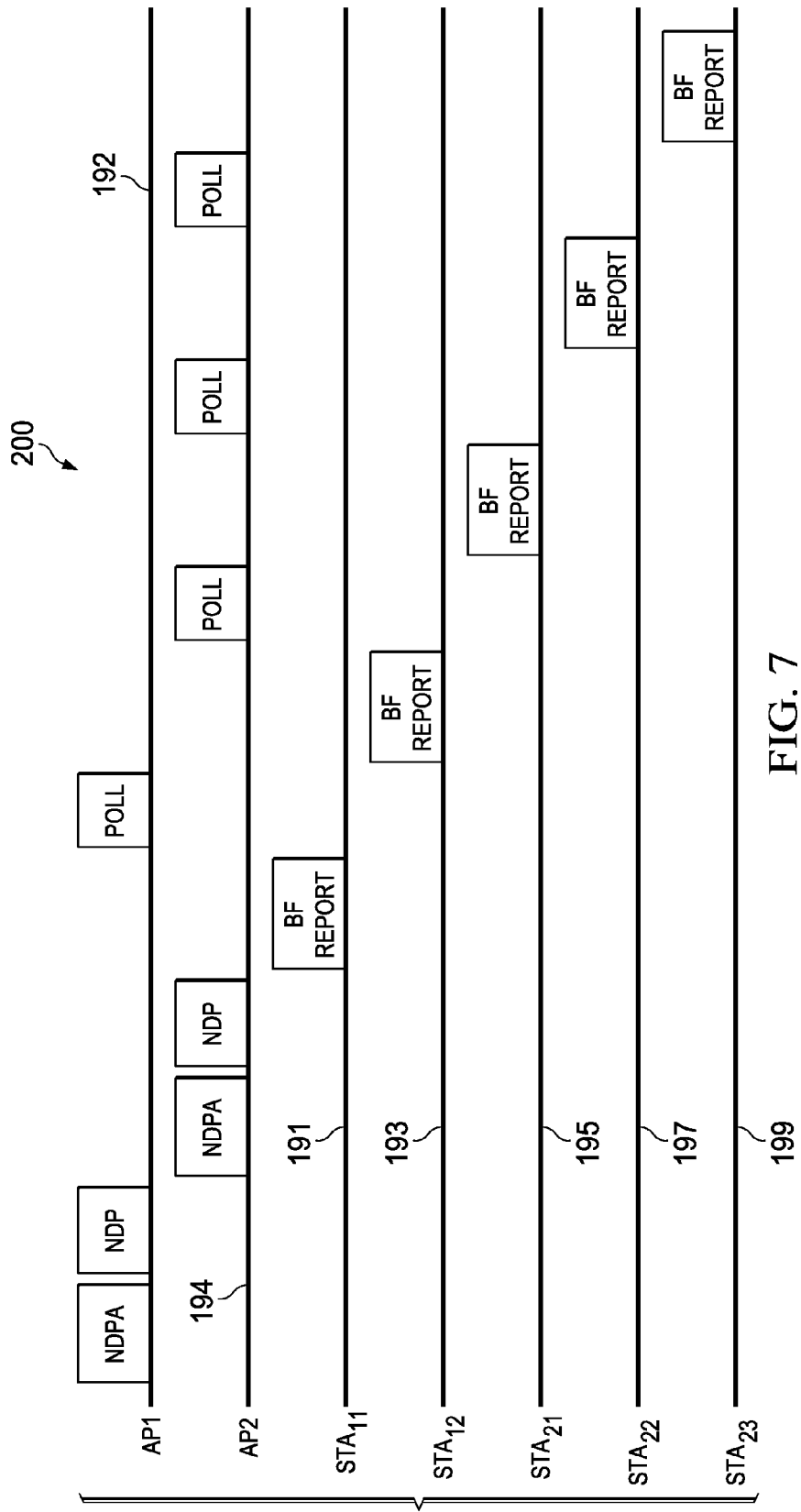
FIG. 7 illustrates another embodiment protocol for channel sounding.

FIG. 7 illustrates protocol 200 for channel sounding in a CSS. Protocol 200 includes communications between AP 192, AP 194, station 191, station 193, station 195, station 197, and station 199. Initially, a leader AP is selected. The leader AP may be the controller AP, the AP that currently has access to the wireless media, or an AP that is assigned by the controller AP. In protocol 200, AP 192 is selected as the leader AP.

Initially, AP 192 signals the start of the channel sounding process. The AP 192 broadcasts an NDPA to signal the identity of the stations for which feedback is desired. The NDPA contains the short IDs of the target stations. In protocol 200, the target stations are stations 191, 193, 195, 197, and 199. The NDPA may include a field in its PHY header to signal the start of the process. Alternatively, AP 192 broadcasts a frame to signal the start of the channel sounding process to the participating APs and stations. This frame may include the identities of the participating APs and stations. After broadcasting the NDPA, AP 192 broadcasts an NDP with sufficient long training fields (LTFs) for the stations to perform channel estimation.

After a short interframe spacing, the non-leader APs broadcast an NDPA, followed by an NDP. One AP broadcasts an NDPA followed by an NDP. Then, the next AP broadcasts an NDPA followed by an NDP. This continues until all participating APs have broadcast an NDPA and an NDP. In one example, the order of the APs is based on their rank. In another example, the leader AP assigns a temporary order to participating APs. All participating APs transmit their NDPAs and NDPs before the stations transmit their feedback reports. In protocol 200, there are two APs, but there may be many more APs.

After the APs have transmitted the NDPAs and NDPs, the stations estimate the channel between themselves and the APs. The NDP is composed of as many LTFs as the number of transmissions. The NDP enables the estimation of channels regardless of the multiple-input multiple-output (MIMO) size and configuration. The stations then broadcast their feedback reports or beamforming (BF) reports. This is initiated when an AP transmits a polling frame to a target AP. The target station responds by broadcasting its feedback report. The AP polls all of its target stations. The end of the polling phase for a particular AP may be signaled by including a bit in the polling frame that indicates the end of the polling frame. Then, the next AP begins its polling of target stations. The APs proceed in rank order to poll the target stations. The target stations respond by broadcasting their feedback reports. This continues until the stations broadcast the channels between themselves and the participating APs. Broadcasting the feedback reports enables the channel information to reach all of the participating APs. To reduce the protocol overhead, the feedback report includes estimated channel information for all the participating APs. The format of the feedback reports may be a compressed V matrix, a precoder index, or another format.

By the end of protocol 200, each participating AP has the estimated channel information for each of the participating stations. Simultaneous multi-AP transmissions may follow based on a client selection criterion.

Protocol 200 may be referred to as explicit feedback, because the channel estimation process starts by explicitly transmitting NDPA and NDP frames from the APs to the stations. In another embodiment, channel estimation is performed without explicitly transmitting the NDPA and NDP frames. All transmitted frames in the WLAN environment include in their PHY headers a set of long training fields (LTFs) that can be used for channel estimation. The stations then continuously estimate the channel between themselves and the transmitting APs. Channel information may later be requested for interference alignment.

Figure 8:
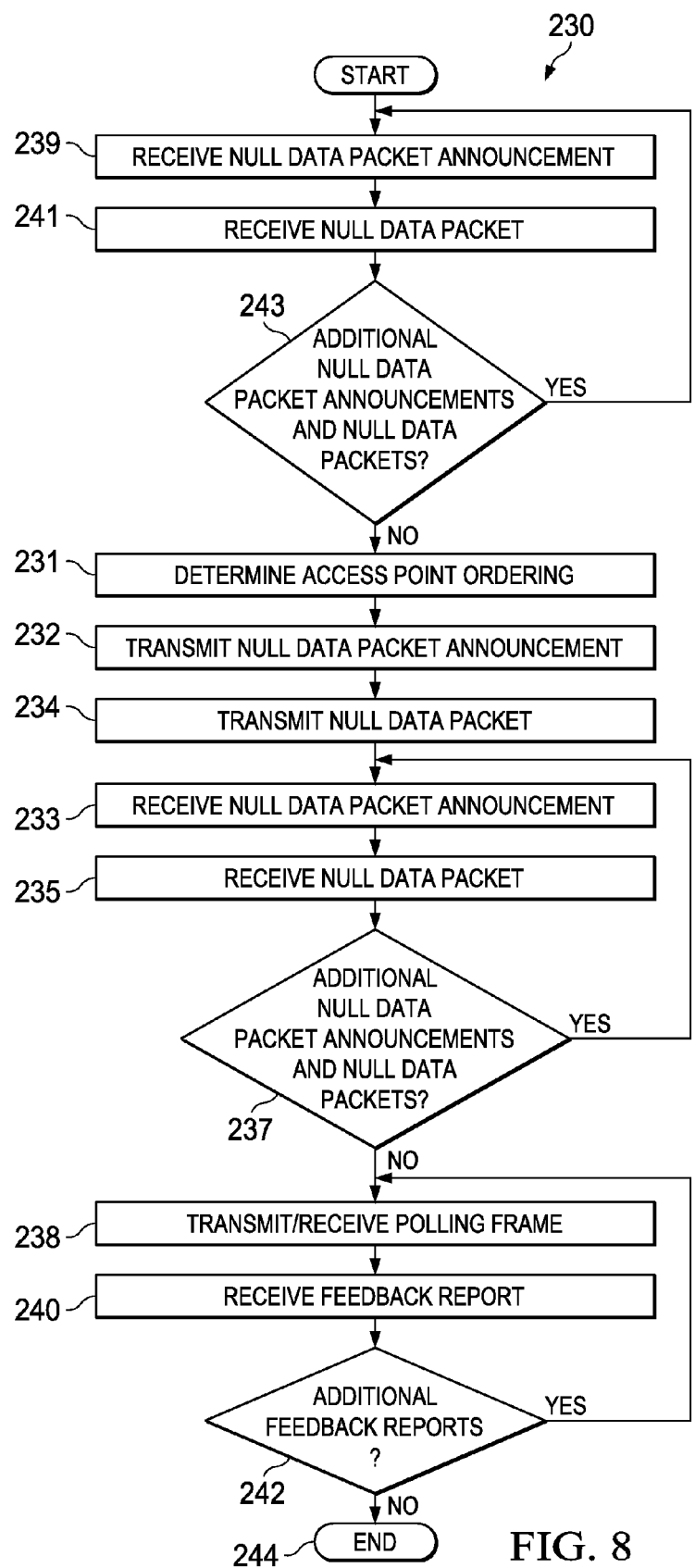
FIG. 8 illustrates a flowchart for an embodiment method of channel sounding performed by an access point.

FIG. 8 illustrates flowchart 230 for a method of channel sounding performed by an AP. Initially, in step 231, the sequence of the APs is determined. The leader AP is the first AP. The leader AP may be the controller AP, the AP that currently has access to the wireless medium, or a member AP that is assigned to be the leader AP by the controller AP. The remaining member APs have an order, which may be predetermined, or may be assigned by the controller AP. In a simplified CSS, only the controller AP communicates with the stations.

When the AP is the leader AP, it proceeds directly to step 232. When the AP is not the leader AP, it proceeds to step 239 to receive the NDPA from the leader AP. The NDPA includes the short IDs for the target stations of the broadcasting APs.

Then, in step 241, the AP receives the NDP from the leader AP. The NDP contains only a PHY header.

In step 243, the AP determines if there are additional APs to transmit NDPAs and NDPs before that AP. When there are additional APs, the AP proceeds to step 239 to receive the NDPA from the next AP. When there are no additional APs, the AP proceeds to step 232 to transmit its NDPA.

When it is the turn of the AP, it transmits an NDPA in step 232. The NDPA contains station IDs of the stations targeted by the AP.

After a SIFS, the AP transmits an NDP to the target stations in step 234. Then, the AP waits until all participating APs have transmitted an NDPA and an NDP frame.

The AP receives an NDPA from another member AP in step 233 when there are APs later in the order.

Next, the AP receives an NDP from that member AP in step 235.

In step 237, the AP determines if there are additional APs to receive an NDPA and NDP from. When there are more APs to transmit an NDPA and NDP, the AP proceeds to step 233 to receive the next NDPA. When there are no more APs, the AP proceeds to step 238.

The APs then poll the stations in the same sequence they transmitted their NDPA and NDP frames. In step 238, the AP transmits a polling frame to a particular station when it is that AP's turn to poll. When it is the turn of another AP to poll, the AP receives a polling frame from another AP.

In response, in step 240, the AP receives a feedback report in step 240. The AP receives feedback reports from the target station it polls, and from the target stations that other APs poll.

Finally, in step 242, the AP determines if there are more feedback reports. When there are no more feedback reports, the method ends in step 244. This occurs when all the APs have polled the target stations. However, when there are more feedback reports, the AP goes to step 238, to repeat the optional polling step, then to step 240 to receive the next feedback report.

Figure 9:
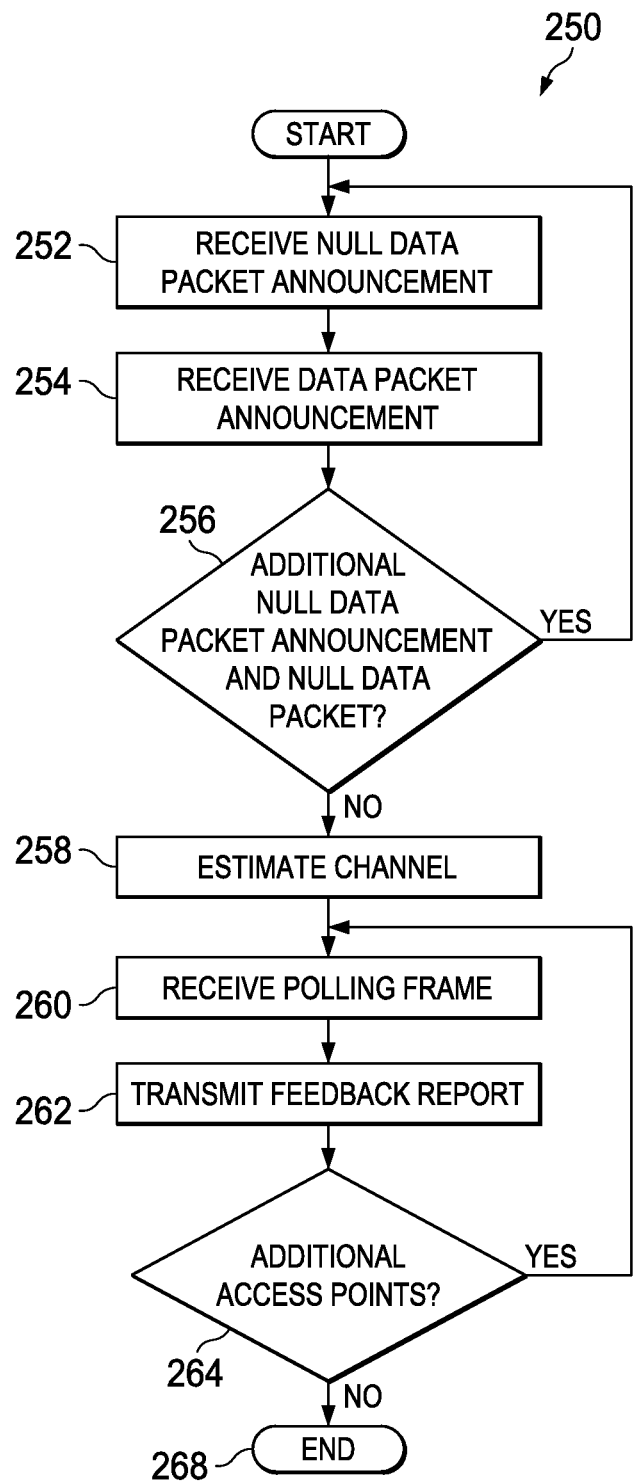
FIG. 9 illustrates a flowchart for an embodiment method of channel sounding performed by a station.

FIG. 9 illustrates flowchart 250 for a method of channel sounding performed by a station. Initially, in step 252, the station receives an NDPA from the leader AP. The station determines whether its station ID is contained in the NDPA.

When the station ID is contained in the NDPA, the station receives an NDP containing the short IDs of the target stations from the leader AP in step 254. When the short ID is not contained in the NDPA, the station skips step 254.

Next, in step 256, if there are additional NDPAs and NDPs, the station proceeds to step 252 to receive an NDPA from the next AP. When there are no more NDPAs, the station proceeds to step 258. In a simplified CSS, only the controller AP broadcasts NDPAs and NDPs.

In step 258, the station estimates the channel between itself and the first AP it received an NDP from.

Next, in step 260, the station receives a polling frame from the APs.

In response, in step 262, the station broadcasts a feedback report to the APs with the channel information between the station and the leader AP.

In step 264, the station determines if there are additional APs that it received NDPs from. If there are no additional APs, the method ends in step 268. If there are additional APs, the station proceeds to step 260 to receive a polling frame from the next AP. In a simplified CSS, only the controller AP polls the stations.

Figure 10:
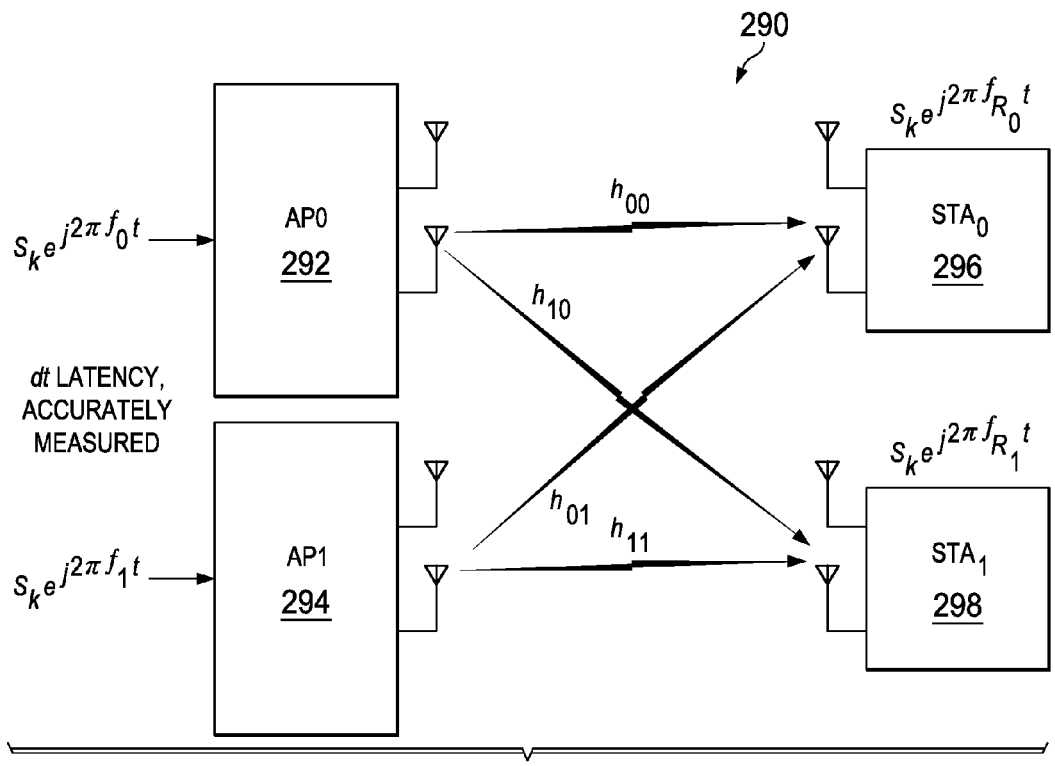
FIG. 10 illustrates a diagram with different oscillator frequencies for two access points.

In a CSS, the APs may be synchronized. FIG. 10 illustrates CSS 290 containing two APs, AP 292 and AP 294, and two stations, station 296 and station 298. A controller AP, for example AP 292, indicates a member AP, for example AP 294, for concurrent transmission. This is performed after stations have been associated with the CSS, APs have been selected and a channel sounding protocol has been performed, such as protocol 200. There is a latency between APs, for example between AP 292 and AP 294, that may be measured in advance. Then, the latency can be compensated for by delaying the transmission between the APs. However, the phase offset caused by a different oscillator frequency for the APs is problematic to compensate for.

The channel between AP 292, AP 294, station 296, and station 298 is given by:

$$H(t) = \begin{bmatrix} h_{00}e^{j(\omega_0-\omega_{R_0})t} & h_{01}e^{j(\omega_1-\omega_{R_0})t} \\ h_{10}e^{j(\omega_0-\omega_{R_1})t} & h_{11}e^{j(\omega_1-\omega_{R_1})t} \end{bmatrix},$$

where $$2\pi f_0 = \omega_0, 2\pi f_1 = \omega_1, 2\pi f_{R_0} = \omega_{R_0}, 2\pi f_{R_1} = \omega_{R_1}.$$

The time offset in the time domain channel H(t) may be estimated by decomposing it into three matrices, R(t)HT(t), where:

$$R(t) = \begin{bmatrix} e^{-j\omega_{R_0}t} & 0 \\ 0 & e^{-j\omega_{R_1}t} \end{bmatrix},$$

$$H = \begin{bmatrix} h_{00} & h_{01} \\ h_{10} & h_{11} \end{bmatrix}, \text{ and}$$

$$T(t) = \begin{bmatrix} e^{-j\omega_0 t} & 0 \\ 0 & e^{-j\omega_1 t} \end{bmatrix}.$$

The channel does not change by multiplying by:

$$1 = e^{j\omega_0 t} e^{-j\omega_0 t}.$$

Thus, $$H(t) = e^{j\omega_0} R(t)HT(t)e^{-j\omega_0 t}, \text{ and}$$

$$H(t) = \begin{bmatrix} e^{-j(\omega_0-\omega_{R_0})t} & 0 \\ 0 & e^{-j(\omega_0-\omega_{R_1})t} \end{bmatrix} H \begin{bmatrix} 1 & 0 \\ 0 & e^{j(\omega_1-\omega_0)t} \end{bmatrix}.$$

The leftmost matrix indicates the frequency offset between AP 292 and stations 296 and 298, while the rightmost matrix indicates the frequency offset between AP 292 and AP 294. The offset between the APs and the stations is determined based on short training fields (STFs) and long training fields (LTFs).

Figure 11:
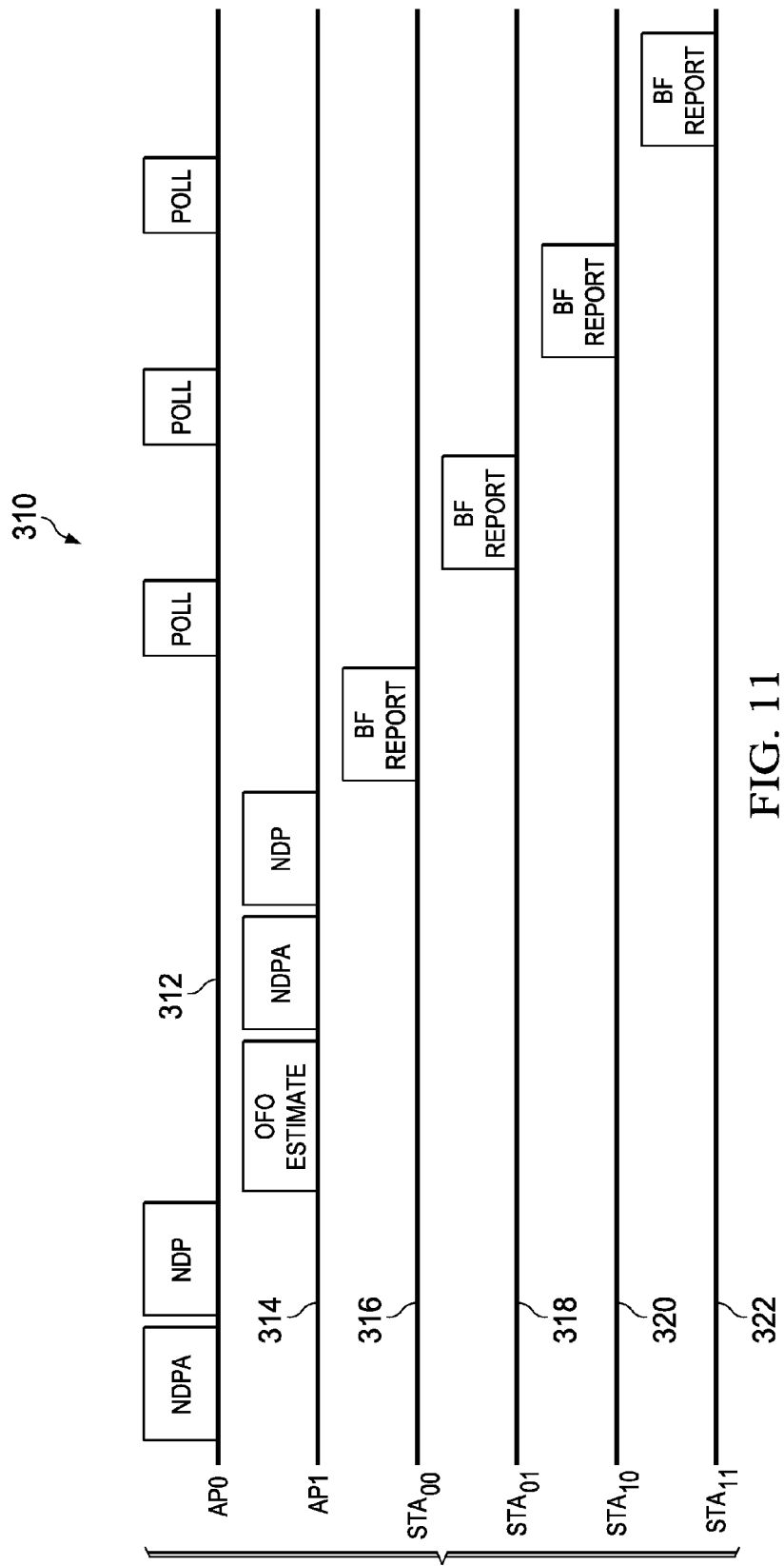
FIG. 11 illustrates an embodiment protocol for channel sounding while compensating for an oscillator frequency offset.

FIG. 11 illustrates protocol 310 for channel sounding while compensating for an oscillator frequency offset caused by the different oscillator frequencies for different APs. Initially, the leader AP, AP 312, broadcasts an NDPA, followed by an NDP. When the NDPA and NDP are broadcast from AP 312, AP 314 receives those packets, along with the stations. Using the STF and LTF in the preamble of NDPA and NDP, the oscillator frequency offset (OFO) between the APs may be estimated. Before AP 314 broadcasts an NDPA and NDP, some processing time is used to estimate the OFO. When all the NDPAs and NDPs have been transmitted, the stations (316, 318, 320, and 322) receive polling requests from the APs in sequence, and respond with a feedback report. As pictured, only AP 312 polls the stations. Station 316 is polled first, followed by station 318, station 320, and station 322, respectively.

Alternatively, the OFO is estimated with a special pulse train sent from AP 312 to AP 314 through the back-haul connection between the APs. A numerically controlled oscillator using a stable temperature compensated crystal can use this pulse train to reproduce the clock frequency of AP. Then, AP 314 broadcasts an NDPA, followed by an NDP.

Figure 12:
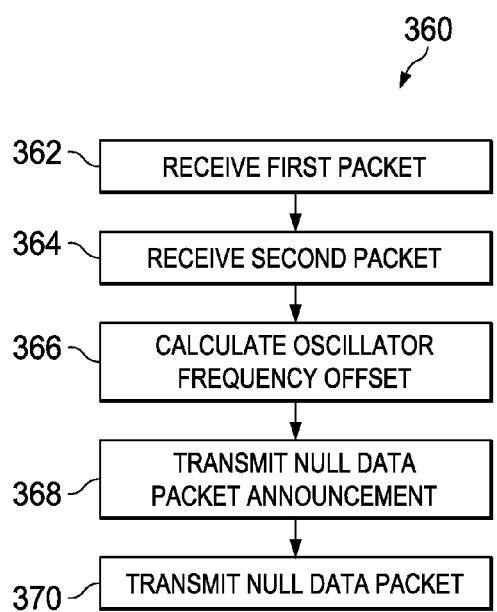
FIG. 12 illustrates a flowchart for an embodiment method of channel sounding while compensating for an oscillator frequency offset.

FIG. 12 illustrates flowchart 360 for a method of channel sounding while compensating for frequency offset performed by an AP. Initially, in step 362, the AP receives a first packet from another AP. For example, the first packet is an NDPA containing oscillator frequency information in the preamble. In another example, the first packet is a part of a pulse train.

Then, in step 364, the AP receives a second packet from the same AP. In one example, the second packet is an NDP containing oscillator frequency information in the preamble. In another example, the second packet is a part of a pulse train.

Next, in step 366, the AP calculates the OFO.

After calculating the OFO, the AP then transmits an NDPA in step 368. The NDPA may contain oscillator frequency information about this AP in the preamble.

Finally, in step 370, the AP transmits an NDP. In an example, the preamble of the NDP also contains oscillator frequency information.

Figure 13:
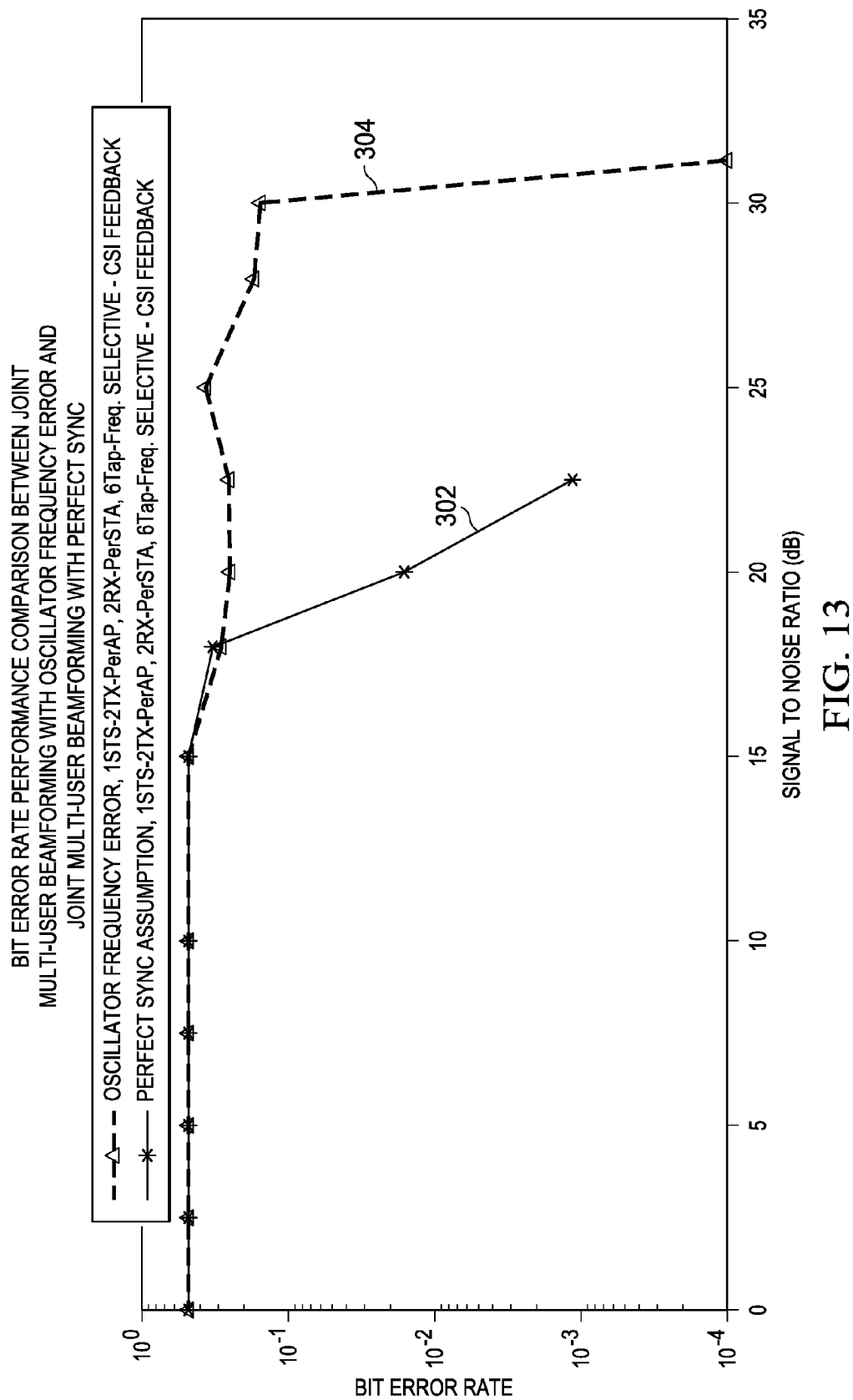
FIG. 13 illustrates a graph of signal to noise ratio (SNR) versus bit error rate (BER) for joint multi-user beamforming with an oscillator frequency error and with perfect synchronization.

FIG. 13 illustrates a graph of signal to noise ratio (SNR) in decibels (dBs) versus bit error rate (BER) for joint multi-user beamforming (JMB) with oscillator frequency error and with perfect synchronization. Curve 302 shows the BER with oscillator frequency error, and curve 304 shows the BER with perfect synchronization. Especially at a higher SNR, the joint multi-user beamforming performs significantly better with perfect synchronization than with an oscillator frequency error.

Orthogonal frequency division multiplexing (OFDM) performs well when the orthogonality of symbols is maintained. However, orthogonality of symbols may be reduced by inter-symbol interference (ISI) or inter-carrier interference (ICI). One source of distortion is carrier frequency offset (CFO).

CFO may lead to phase noise due to the instability of the oscillators used at the transmitter and receiver. For example:

$$y[n] = IFFT\{Y[k]\} = IFFT\{H[k]X[k] + X[k]\}, \text{ and}$$

$$y[n] = \frac{1}{N}\sum_{k=0}^{N-1} H[k]X[k]e^{j2\pi(k+\varepsilon)n/N} + Z[n].$$

Thus, the inverse fast Fourier transform (IFFT) of $$X[k]e^{j2\pi\varepsilon n/N}$$

is calculated before passing the fading channel. The generated phase offset is $\varepsilon$, such that $(-\pi \le \varepsilon < \pi)/2\pi$. That is, $|\varepsilon| \le 0.5$.

Figure 14:
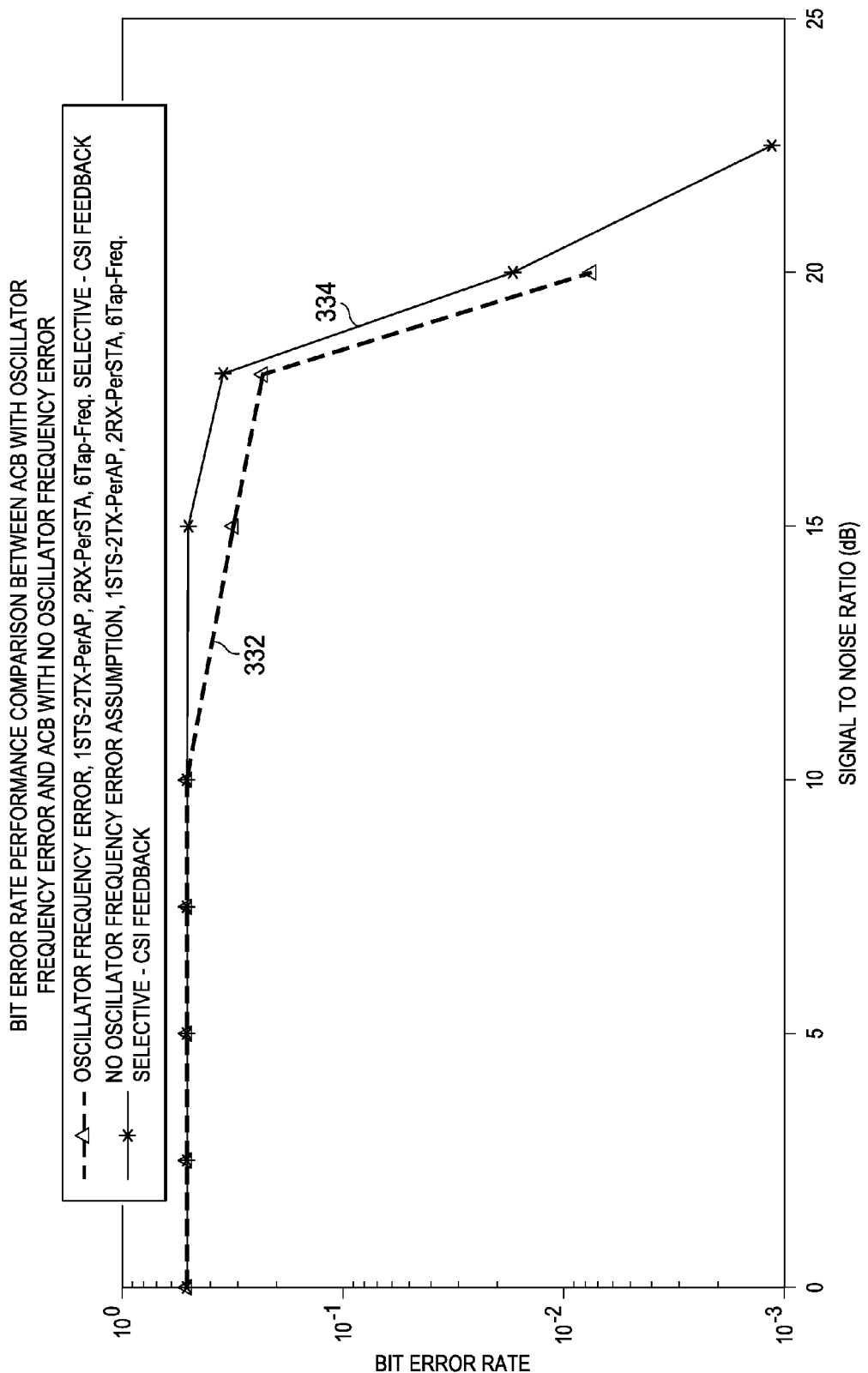
FIG. 14 illustrates a graph of SNR versus BER for access point collaborative beamforming with an oscillator frequency error and with perfect synchronization.

FIG. 14 illustrates a graph of SNR in dB versus BER with oscillator frequency error and without oscillator frequency error. Curve 332 shows the BER with oscillator frequency error, and curve 334 shows the BER without oscillator frequency error. The BER is slightly lower with an oscillator frequency error.

The CFO is:

$$e^{j2\pi(\omega_1-\theta)} + e^{j2\pi(\omega_0-\theta)}.$$

The CFO provides a cyclic delay diversity (CDD). The CFO is a less important factor in performance degradation.

Synchronization may be performed using STFs and LTFs. Packet detection may be determined after observing about seven or eight peaks of the correlation of STF sequences. Also, the CFO and symbol timing offset may be estimated in STFs. Then, the fine CFO may be determined using the next two consecutive LTFs.

Figure 15:
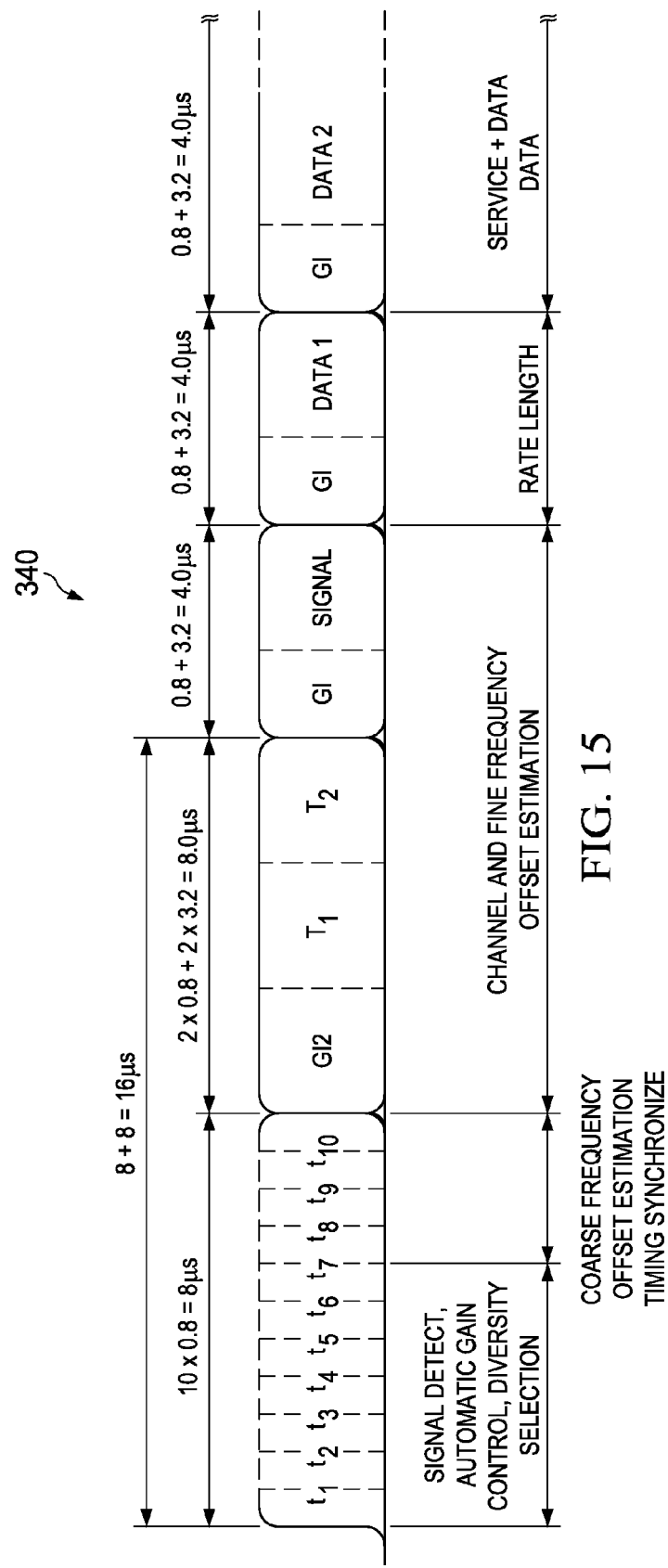
FIG. 15 illustrates synchronization of APs using short training fields (STFs) and long training fields (LTFs)

FIG. 15 illustrates timing diagram 340 for synchronization of APs using STFs and LTFs. Initially, the signal is detected, diversity is selected, and automatic gain control (AGC) is performed. Then, the coarse frequency offset is estimated, and timing is synchronized. Next, the channel and fine frequency offset are estimated. The rate length is determined, and data is transmitted.

Packets may be detected, for example, using autocorrelation or cross-correlation. For example, $$R(d) = \sum_{m=0}^{L-1} (r^*_{d+m} r_{d+m+L}),$$

where $r_d$ represents the value of the dth incoming sample for autocorrelation, or the dth STF sample for cross-correlation. The normalized value, M(d), of the correlation may be compared with a certain threshold. A match is found when the normalized value is above a threshold. For example, $$M(d) = \frac{|R(d)|^2}{(P(d))^2},$$

where P(d) is:

$$\sum_{m=0}^{L-1} |r_{d+m+L}|^2.$$

Also, $\hat{\epsilon} = \epsilon_1 + \epsilon_2$.

Once the packet detection is performed, after seven or eight peaks are observed, the correlation continues, and two or three more peaks are found. R(d) is found, where d is the peak position. An angle of R(d) at the peak positions repeats for two consecutive peaks. The average angle of the two or three peak positions is the coarse CFO estimation of $-2\pi\epsilon_1$.

After the coarse CFO estimation is performed, the correlation continues. The window size for the correlation is 64, because the FFT size of the LTFs is 64. The procedure is performed similarly, with the coarse CFO estimation of $-2\pi\epsilon_2$.

Figure 16:
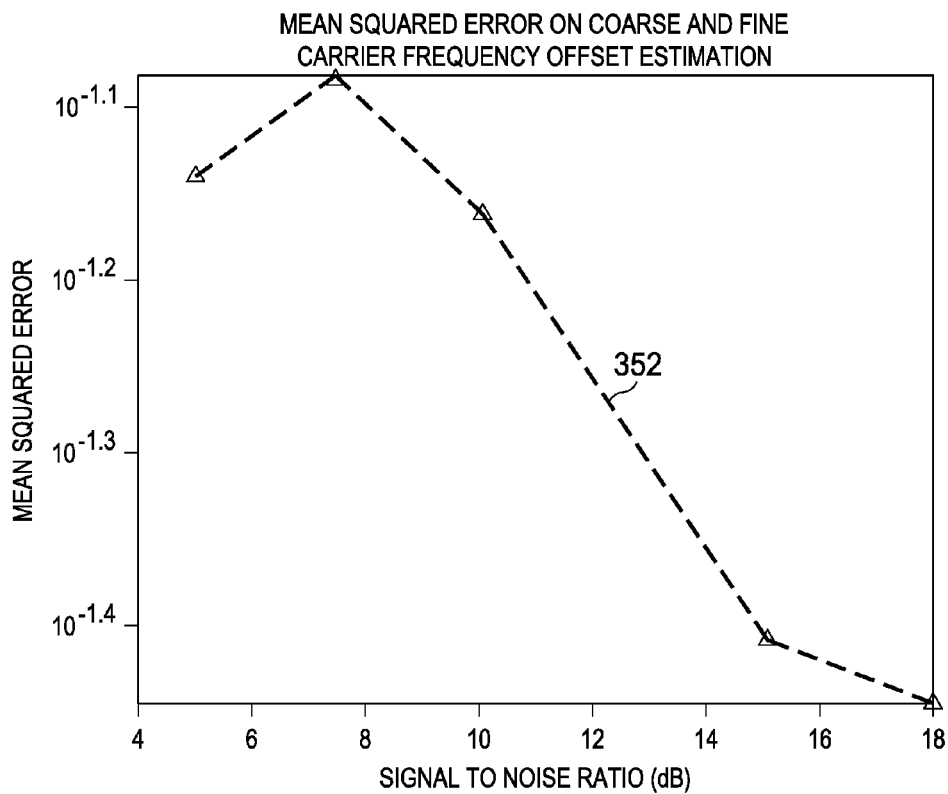
FIG. 16 illustrates a graph of SNR versus mean squared error (MSE) for carrier frequency offset (CFO) estimation.

The final CFO estimation is $-4\pi(\epsilon_1+\epsilon_2)$. FIG. 16 illustrates a graph of SNR in dB versus mean squared error (MSE) on coarse and fine CFO estimation. Curve 352 shows the MSE as a function of SNR.

Figure 17:
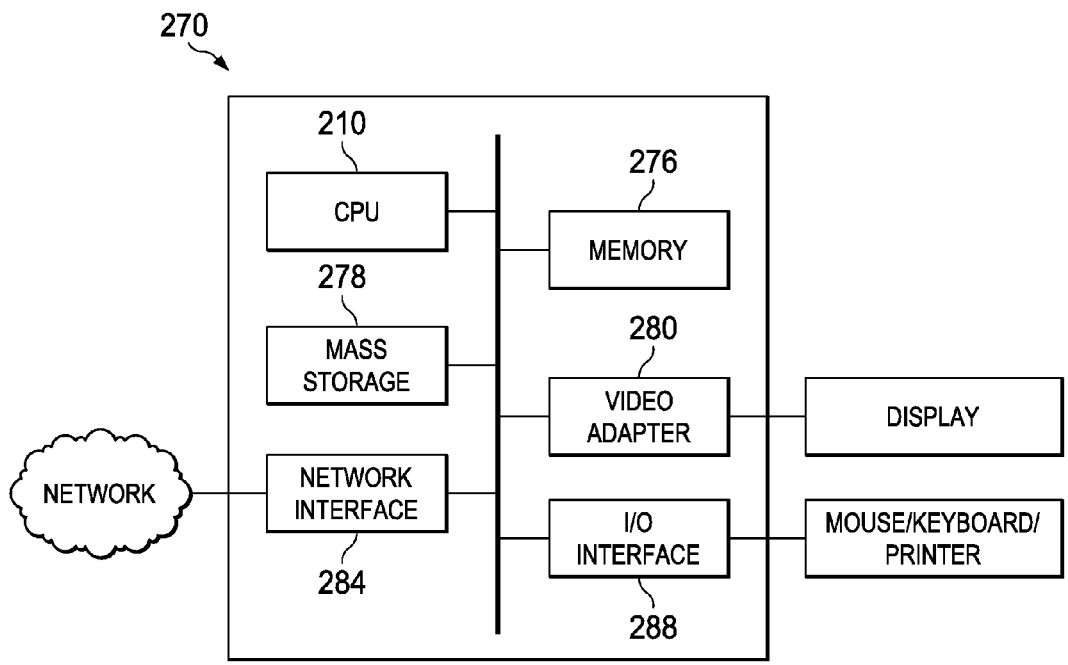
FIG. 17 illustrates a block diagram of an embodiment of a general-purpose computer system.

FIG. 17 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A collaborative service set (CSS) comprising:
a controller access point (AP) configured to be associated with a first plurality of stations and a first member AP, wherein the first member AP is associated with a second plurality of stations, wherein the controller AP is configured to coordinate transmissions between the first member AP and the second plurality of stations with transmissions between the controller AP and the first plurality of stations, wherein the controller AP is configured to supervise collection of channel information for channels between the first member AP and the second plurality of stations, channels between the first member AP and the first plurality of stations, channels between the controller AP and the first plurality of stations, and channels between the controller AP and the second plurality of stations, and wherein the controller AP and the first member AP are configured to transmit messages simultaneously.

2. The CSS of claim 1, wherein a first station of the first plurality of stations is configured to freely associate with the first member AP.

3. The CSS of claim 1, wherein the first member AP is a leader AP.

4. The CSS of claim 1, wherein the controller AP is a leader AP.

5. The CSS of claim 1, wherein the controller AP is configured to be associated with a plurality of member APs comprising the first member AP.

6. The CSS of claim 1, wherein the controller AP, the first member AP, and the first plurality of stations are coupled by a signaling channel.

7. The CSS of claim 1, wherein the first plurality of stations is associated with a plurality of unique station identification numbers (IDs) and a plurality of media access control (MAC) addresses, wherein a length of each of the plurality of unique station IDs is shorter than a length of each of the plurality of MAC addresses.

8. The CSS of claim 7, wherein the plurality of unique station IDs is a plurality of association identification numbers (AIDs).

9. The CSS of claim 1, wherein the controller AP and the first member AP are coupled by a distribution system.

10. A method of channel sounding in a collaborative service set (CSS), the method comprising:
broadcasting, by a first access point (AP), a first null data packet announcement (NDPA) comprising a short identification number (ID) of a first station;
broadcasting, by the first AP, a first null data packet (NDP) after transmitting the first NDPA;
receiving, by the first AP from a second AP, a second NDPA;
receiving, by the first AP from the second AP, a second NDP after receiving the second NDPA, wherein the first AP is a leader AP, and wherein receiving the second NDPA is performed after transmitting the first NDP;
transmitting, by the first AP to the first station, a first polling frame after transmitting the first NDP and receiving the second NDP; and
receiving, by the first AP from the first station, a first feedback report after transmitting the first polling frame.

11. The method of claim 10, wherein the second AP is a leader AP, and wherein transmitting the first NDPA is performed after receiving the second NDP.

12. The method of claim 10, further comprising:
receiving, by the first AP from a second station, a second polling frame; and
receiving, by the first AP from the second station, a second feedback report after receiving the second polling frame.

13. A method of channel sounding in a collaborative service set (CSS), the method comprising:
receiving, by a station from a first access point (AP), a first null data packet announcement (NDPA) comprising a first simplified short identification number (ID) of the station;
receiving, by the station from the first AP, a first null data packet (NDP) after receiving the first NDPA;
receiving, by the station from a second AP, a second NDPA after receiving the first NDP;
receiving, by the station from the second AP, a second NDP after receiving the second NDPA;
estimating a first channel between the station and the first AP in accordance with the first NDP to produce a first estimated channel;
receiving a first polling frame, by the station from the first AP; and
broadcasting, by the station, a first feedback report in accordance with the first estimated channel after receiving the first polling frame.

14. The method of claim 13, further comprising:
estimating a second channel between the station and the second AP in accordance with the second NDP to produce a second estimated channel;
receiving a second polling frame, by the station from the second AP; and
broadcasting, by the station, a second feedback report in accordance with the second estimated channel.

15. A method of determining an oscillator frequency offset between a first access point (AP) and a second AP, the method comprising:
receiving, by the second AP from the first AP, a first packet comprising a first preamble;
receiving, by the second AP from the first AP, a second packet comprising a second preamble after receiving the first packet;
determining an oscillator frequency offset between the first AP and the second AP in accordance with the first preamble and the second preamble;
broadcasting, by the second AP, a null data packet announcement (NDPA) after calculating the oscillator frequency offset wherein the NDPA contains the calculated oscillator frequency offset; and
broadcasting, by the second AP, a null data packet (NDP).

16. The method of claim 15, wherein the first packet is a first null data packet announcement (NDPA) and the second packet is a first null data packet (NDP).

17. The method of claim 15, further comprising waiting a first processing time after receiving the first packet before broadcasting the second NDPA.

18. The method of claim 15, wherein determining the oscillator frequency offset comprises:
estimating a coarse carrier frequency offset; and
estimating a fine carrier frequency offset.

19. The method of claim 15, wherein the first preamble comprises a short training field and a long training field.

20. The method of claim 15, wherein a pulse train comprises the first packet and the second packet, and wherein determining the oscillator frequency offset comprises reproducing a clock frequency of the first AP by a stable temperature compensated crystal in accordance with the pulse train.

* * * * *